UNITED STATES PATENT OFFICE.

CARL P. ANDERSON, OF EVERETT, MASSACHUSETTS, ASSIGNOR, BY MESNE ASSIGNMENTS, TO GEORGE H. KIMBALL, OF CHELSEA, MASSACHUSETTS.

COMPOSITION FOR ARCHITECTURAL FINISH.

1,290,035.     Specification of Letters Patent.     Patented Jan. 7, 1919.

No Drawing. Application filed December 16, 1912, Serial No. 736,879. Renewed May 29, 1918. Serial No. 237,364.

*To all whom it may concern:*

Be it known that I, CARL P. ANDERSON, a citizen of the United States, residing at Everett, in the county of Middlesex and State of Massachusetts, have invented new and useful Improvements in Compositions for Architectural Finish, of which the following is a specification.

This invention relates to an improved composition for architectural finish. More particularly it relates to compositions for covering cement and other surfaces, to give some particular tint, or to produce uniformity of tint, or protect the material from disintegration under attack of moisture, heat or the elements. It is especially intended for use under circumstances in which ordinary paint, varnish, etc., are inadequate. To this end it is the purpose of the invention to provide a composition that can be applied to the walls and surfaces, exterior and interior, of any structure, including subterranean structures; and which, when properly applied, will adhere permanently and will remain unchanged in texture and tint under the adverse conditions mentioned above. The resistance to moisture is especially valuable for surfaces of porous material, in subterranean structures or when exposed to the weather. The resistance to heat is valuable to protect against blistering, curling, or other effects of weather and for protection against ignition or other fire damage. When a covering is applied to brick or concrete it is desirable that the characteristic appearance of that material be not destroyed, as it is, for example, by ordinary paint. The preservation of such characteristic is one distinctive feature of the finish to which the present invention relates. It is the object of the invention to gain these various improved results, and as well the good "covering power" or opacity, ease of application, and other advantages that characterize the composition, as will be apparent to those who use the composition herein set forth, or suitable variations of it; and it is the object of this patent to cover, in the claims, such novel elements or combinations of elements or methods as exist in the composition disclosed.

The best manner at present known to me for compounding and practising the invention, after experimenting with a number of variations, is by use of the following formula:

480 lbs. zinc oxid
180 " calcined plaster
60 " ground asbestos
150 " ground pumice stone (100 bolt)
32 gals. prepared oil.

The oil may be prepared by this formula:
55 gals. boiled linseed oil
35 " boiled china wood oil
20 " litharge drier
90 " fugitive oil.

It will be understood that the above ingredients are to be ground and mixed together; after which about 10 gallons of fugitive oil and 5 gallons of spirit of turpentine may be added to 800 pounds of the above product and well mixed, to make the product in condition for market or for use without further thinning. The term "fugitive oil" is used as meaning one that evaporates readily at ordinary temperatures without drying. For this purpose mineral hydrocarbons are suitable, such as the distillates of petroleum within the range that comprises naphtha and benzin, although some kerosene may also be included, provided it does not exceed a small proportion. The "fugitive oil" therefore is to be distinguished from turpentine and other ordinary thinners and from the "oil" in paints, meaning the linseed or other oil which dries and solidifies when the paint is spread and exposed to the air, in that it does not dry but quickly departs by evaporation at ordinary temperatures before the drying of the linseed oil, etc., that is present.

In use the composition should be applied only when the surface to be covered is free from loose dust and is somewhat rough or porous, as distinguished from being highly polished or vitreous. It should be applied with a full flowing brush, without being worked out or extended as is customary with oil paint. It may be applied in one or more coats, with suitable intervals for complete drying, a single coat being more than equal to a single coat of lead and oil in opacity.

The foregoing is for producing a white finish. Suitable modification may be made, as by the use of proper pigments, for producing any tint or color; and obviously other variations from the precise details of the formula given may be made while still employing the essence of the invention within the scope of the appended claims. After being applied the composition quickly dries with a hard, firm finished surface, of dull velvet-like aspect.

One important feature that characterizes the composition of the invention is that it makes a somewhat porous layer through which moisture passes to or from the material covered, without forcing off the layer. Other important features are the means by which this porosity and this permanence of grip are attained, viz., by the use of pumice stone, and by the use of a fugitive oil as a vehicle. Other features will appear later herein.

Ordinary paint does not cling to a material whose pores contain moisture; nor when subjected to excessive heat; nor does it, if spread on a combustible material, such as wood, for example, materially delay the ignition of combustion of the wood. The same is true of varnishes and preparations of gum that have heretofore been proposed.

The present composition differs from such in that it has a minor proportion of linseed oil, or the like, and apparently does not rely upon this oil to perform the functions which the oil performs in "oil" paints. While it is necessary to have oil or some other suitable liquid vehicle for the solids, such oil is in large part fugitive; and the part which is not fugitive is desired to be relatively small because of the difference between this and paint of the ordinary types. In ordinary paint the solids are enveloped in a film of hardened oil which holds them together by its filmous tenacity and holds them in place on the material, because parts of the film have penetrated the pores of the material. This film is impervious to water. Moisture within the material cannot escape at the surface without forcing this film out of the pores, and away from the surface; and the attachment is not so firm as to prevent the escape of moisture in this manner, particularly in subterranean work. In the composition of the invention, on the contrary, the proportion of such oil is minimized and reliance is had upon other means, notably the pumice, to hold the solid matter together, and to hold the whole on the surface to which it has been applied. While the precise explanation of the action of the various ingredients in the composition may remain to be determined by future investigation, it is believed that the pumice acts with the aforesaid characteristic because of its porous nature and because of the shapes of individual particles, with the result that the coating as a whole is somewhat porous. Being so, it acts as a means of relief that permits water which may be within the cement or other material, seeking outlet therefrom, to pass slowly outward through the coating, passing through or beside the particles of pumice, instead of forcing the coating off. This explanation seems to be supported by the fact that the pumice, which may be the ground pumice stone of commerce originating in the region of Naples, Italy, enables water to pass through the coating if ground to a fineness of about one-hundred bolt, while if it be ground too fine water will not pass through. The particles are perhaps sharp and claw-like in their texture so that they seize and engage mechanically the minute roughness of the cement or other surface to which they are applied in a manner unlike the way in which particles of zinc or lead salts, calcine plaster or other ingredients which have heretofore been used in paints do, and of course in a manner unlike the way oil or glue do. This characteristic of mechanical engagement of solids with each other and with the material covered, with a minimum of oil, is possibly the reason why the coating of the invention is not stripped off under the action of heat. Oil paint which, on the contrary, is held by the tenacity of the film of oil peels off, because the oil is subject to greater evaporation, or to unequal expansion, when one side is exposed to heat, and lacks the mechanical fastening to the surface. For the same reason the new composition does not work so well on a highly polished or vitreous surface.

The evaporation of the fugitive oil, after it has served its purpose as a vehicle for the solids, leaves the composition with pores of microscopic size, communicating with the pores of the material on which it is spread. In general it is hard and firm, not elastic like oil paint; and is of more stony characteristic, being crumbly or brittle, rather than tenacious in a film like manner, when scraped; but very tenacious or adhesive to the material on which it has been spread. The other ingredients combine with the pumice and that part of the oil which remains as a part of the composition in its permanent form. Zinc oxid is the ordinary composition known by that name in commerce and is preferred to lead oxid as a pigment as being lighter and therefore standing up better in the liquid. This principle is also kept in mind in choosing the other ingredients. The ground asbestos, and the plaster-of-Paris are somewhat interchangeable, and either one might be substituted for the other, or other material substituted for both, with nearly as good results. The fire resisting quality is evidently independent of the asbestos. While the pores in the finished covering will allow water to pass through they will not let enough air through to support combustion. As the composition is itself incombustible when dry, and adheres firmly in the presence of high temperatures; it acts as a retardent of combustion when applied to any combustible substance, by keeping the air away from it.

The same characteristic preserves the surface of cement from the constant disintegration that occurs when left bare in contact with air.

Because the pores are so small, and because under ordinary circumstances there is nothing to move air through them, it may be said that for practical purposes the coating is pervious to water and not pervious to air; and this results, practically, in the coating being a valuable preservative for metal lathing, and iron and steel girders, which corrode in presence of air and water combined.

I claim:

1. A composition adapted to form a permanent coating suitable for architectural finish comprising the combination of a liquid vehicle having a drying oil base and containing fugitive oil with mineral ingredients containing finely ground porous material; there being sufficient of said fugitive oil and porous material to leave the permanent coating porous when the fugitive oil has evaporated.

2. A composition adapted to form a permanent coating suitable for architectural finish comprising the combination of a liquid vehicle having a drying oil base and containing fugitive oil, with mineral ingredients including finely ground pumice stone; there being sufficient of said fugitive oil and pumice stone to leave the permanent coating porous when the fugitive oil has evaporated.

3. A composition for architectural finish comprising a liquid adapted to be spread and dried on a surface, leaving a residuum of impervious material substantially unaffected by water and the elements, arranged in the form of a thin layer in which numerous microscopic interstices permitting the passage of water are generally distributed.

4. A composition comprising a liquid adapted to be spread and dried, leaving a residuum providing a final finish for building materials and containing a porous ingredient distributed generally throughout it, whereby communication is maintained between the pores of the building material and the atmosphere.

5. A composition for architectural finish comprising a liquid vehicle, a suitable pigment and other ground mineral matter including enough pumice stone to make the finish porous when dry.

6. A composition for architectural finish composed approximately of four parts metallic pigment, two parts of inert light mineral, one part pumice stone, and sufficient oil for grinding and mixing composed approximately, half of vegetable drying oil and half of readily evaporative mineral oil.

7. A composition adapted to form a permanent cover for surfaces comprising a liquid vehicle having a drying oil base containing a substantial proportion of fugitive oil and solid ingredients having concavities through which there may be communication between the pores of the covered surface and the atmosphere; the said proportion of fugitive oil being large enough to prevent the drying oil from forming an impervious film.

8. A composition adapted to form a permanent cover for surfaces comprising a liquid vehicle having a drying oil base containing a substantial proportion of mineral hydro-carbons that are readily evaporative at ordinary temperatures and solid ingredients having concavities through which there may be communication between the pores of the covered surface and the atmosphere; the said proportion of fugitive oil being large enough to prevent the drying oil from forming an impervious film.

9. A composition adapted to form a permanent cover for surfaces comprising a liquid vehicle having a drying oil base containing a substantial proportion of the distillates of petroleum of the naphtha and benzin range and including a little kerosene, combined with solid ingredients having concavities through which there may be communication between the pores of the covered surface and the atmosphere; said proportion of fugitive oil being large enough to prevent the drying oil from forming an impervious film.

10. An evaporative and drying liquid composition for finishing surfaces of building materials having a drying oil base and material which when dry forms an adhesive solid covering for such a surface provided with a great number of pores capable of allowing passage of water.

11. A composition adapted to form a permanent coating for building materials comprising vegetable drying oil and mineral solids, including a finely powdered ingredient having the properties of pumice stone and being of texture adapted to make mechanical engagement with other solids therein and with the material to which the coating is applied; said composition being distinguished from oil paints by having so much less of said oil that when dry the filmous characteristic of oil paints is absent.

12. A composition adapted to form a permanent coating suitable for architectural finish comprising the combination of a liquid vehicle having a drying oil base and containing fugitive oil, with mineral ingredients comprising solids that are relatively light in specific gravity, including pumice stone in sufficient quantity to render the coating porous after the fugitive oil has evaporated.

Signed by me at Boston, Mass., this 13th day of December, 1912.

CARL P. ANDERSON.

Witnesses:
JOSEPH T. BRENNAN,
EVERETT E. KENT.

Copies of this patent may be obtained for five cents each, by addressing the "Commissioner of Patents, Washington, D. C."